3,468,703
SUBSTRATES COATED WITH AQUEOUS DISPERSIONS OF RAPIDLY CRYSTALLIZABLE VINYLIDENE CHLORIDE INTERPOLYMERIZATES
Dale S. Gibbs, Midland, Wallace J. Miles, Houghton Lake, and Eugene Kochaney, Bay City, Mich., assignors to The Dow Chemical Company, Midland, Mich., a corporation of Delaware
No Drawing. Filed Oct. 14, 1966. Ser. No. 586,661
Int. Cl. C08d 13/16; C08c 17/16
U.S. Cl. 117—155  4 Claims

ABSTRACT OF THE DISCLOSURE

This invention pertains to an improved process for preparing substrates coated with a rapidly crystallizable vinylidene chloride interpolymer. More particularly, it relates to the use, as a coating material, of an aqueous dispersion of an interpolymerizate composed essentially of (1) between about 65 and 80 weight percent of vinylidene chloride, (2) between 5 and 20 weight percent of vinyl chloride, and (3) between about 5 and 20 weight percent of a vinyl alkanoate having from 3 to 8 carbon atoms in the acid portion.

---

These aqueous dispersions possess certain unusual properties which make them eminently suitable for the manufacture of protective coatings. These properties include, among others, the inherent ability of the interpolymerizates contained therein to remain essentially non-crystalline during extended storage of such aqueous dispersions, and the further characteristic of rapid crystallization of the interpolymerizate during coalescence of such dispersion to form essentially continuous, non-blocking, heat-sealable, fused coatings having excellent moisture-barrier and strength properties.

It has become well known that polymers obtained by the polymerization of vinylidene chloride alone or with other polymerizable materials, particularly the normally crystalline vinylidene chloride polymers, are industrially valuable. However, in some instances, the usage of vinylidene chloride polymer latexes as coatings in various applications, particularly those applications requiring high coating speeds has presented serious problems.

It is recognized by those skilled in the art that coatings produced by the coalescence of polymerized vinylidene chloride from aqueous dispersion are generally characterized by rapid crystallization and subsequent formation of a highly crystalline, non-blocking, moisture-resistant protective coating. It has been observed, however, that premature crystallization often occurs within such aqueous polymeric dispersion following several days of storing the same under normal conditions of temperature and pressure. Thus, such polymeric dispersions are often difficultly coalesced to form continuous coatings having the desirable properties described herein.

It is additionally known in the art that the rate of crystallization occurring in such polymeric dispersions may be reduced by the interpolymerization of vinylidene chloride with various other monoethylenically unsaturated monomers, which monomers generally have reactivities similar to that of vinylidene chloride. Examples of such monomers include, acrylic acid or its ester derivatives, such as methyl acrylate, ethyl acrylate, and methyl methacrylate and the like. It has been found, however, that such interpolymers are often characterized by a substantially reduced rate of crystallization and degree of ultimate crystallinity with resultant decreases in moisture-barrier and strength properties following coalescence of the same into coatings and their usefulness is thereby limited, particularly in regard to high speed coating applications.

It is accordingly among the objects of this invention to provide aqueous dispersions of interpolymerizates of vinylidene chloride capable of forming a continuous, highly crystalline, essentially non-blocking, heat-sealable fused coating on cellulosic and various impervious substrates.

It is a further object to provide aqueous dispersions of interpolymerizates of vinylidene chloride wherein such aqueous dispersions remain essentially non-crystalline during extended storage thereof.

It is a still further object to provide aqueous dispersions of interpolymerizates of vinylidene chloride wherein such interpolymerizates crystallize rapidly during coalescence of the aqueous dispersion to form coatings for cellulosic and various impervious substrates, which coatings have excellent moisture-barrier and strength properties.

Among the vinylidene halides which may be used for the purposes of the present invention are vinylidene chloride, vinylidene fluoride, vinylidene bromide, vinylidene chlorofluoride, and the like, vinylidene chloride being preferred. Similarly, the vinyl halides which may be used are vinyl chloride, vinyl fluoride, and vinyl bromide, with vinyl chloride being prefered.

Included within the definition of vinyl alkanoate may be mentioned vinyl propionate, vinyl butyrate, vinyl 2-ethyl hexoate, and the like, or suitable mixtures thereof.

It has further been discovered, which discovery forms a part of the present invention, that the preferred aqueous dispersions contain interpolymerizates having the form of particles, the majority of which are less than about 1200 angstrom units in diameter.

In this regard, it has been found that the use of interpolymerizates of the composition described herein but which are in the form of particles, the majority of which are greater than about 1200 angstrom units in diameter, tend to crystallize more rapidly in aqueous dispersion, and are less stable to the deleterious effects of extended storage. Further, it has been unexpectedly found that interpolymerizates containing the expressed amounts of vinyl acetate as a replacement for the vinyl alkanoate constituent are also significantly less resistant to undesirable premature crystallization during storage in dispersion form.

The interpolymerizates described herein are prepared by carrying out the polymerization of the mixture of monomers in the desired proportions in aqueous dispersion using methods well known in the art; however, conventional batch polymerization techniques are generally preferred. The polymerization reaction may be carried out at any desired temperature from about room temperature up to 100° C.; however, best results are generally obtained by employing temperatures between about 35° C. and 60° C.

Any of the catalysts commonly used for the polymerization of vinyl compounds may be employed in the preparation of the interpolymerizates of the present invention, such as various peroxygen compounds including potassium persulfate and the like.

A wide variety of dispersing or emulsifying agents may be used, such as the alkyl aryl polyether alcohols; the alkyl benzene sulfonates and their salts, such as the sodium salt of dodecyl benzene sulfonate; and the salts of alkyl diphenyl oxide disulfonates, such as sodium dodecyl diphenyl oxide disulfonate; and the alkyl esters of sodium sulfosuccinic acids, among many others. Likewise, any suitable material commonly used in the art for controlling the particle size of the polymeric aqueous dispersion may be used in the present invention. As purely exemplary of such commonly used materials are potassium sulfate and sodium chlorate.

In order to obtain products of maximum uniformity, it may be desirable to introduce one or more of the monomeric materials into the reaction mixture gradually during the course of the polymerization. This expedient also facilitates control of the rate of reaction. Although the polymerization may be carried out in the presence of air, the reaction is ordinarily faster in the absence of air.

Usual additives employed in producing aqueous dispersions of interpolymerizates of vinylidene halides may be included herein. Representatives of such additives are pigments, dyes, fillers, and the like, employed in the conventional concentrations.

The following example, wherein all parts and percentages are to be taken by weight, illustrates the present invention but is not to be construed as limiting its scope.

determined for each film, by heating the film at a temperature of 70° C. for varying periods of time, followed by conventional infrared absorption studies of the so-treated film.

For comparative purposes, individual films, were separately prepared in a manner similar to that previously described. In one of such films the polymeric constituent was composed essentially of polyvinylidene chloride. In other films the polymeric constituent was a terpolymer composed of predominant amounts of vinylidene chloride and minor amounts of ethyl acrylate and vinyl chloride.

The following Table I illustrates the polymeric composition of each of the films, the crystallization induction period of each film at 70° C. and the percent ultimate crystallization of each film following 15 minutes exposure in a 70° C. circulating air oven.

TABLE I

| Run No. | Composition of interpolymerizate, percent by weight of polymerizable materials | | | | Crystallization induction time, minutes at 70° C. | Percent ultimate crystallization following 15 minutes at 70° C. |
|---|---|---|---|---|---|---|
| | Vinylidene chloride | Vinyl chloride | Ethyl acrylate | Vinyl propionate | | |
| For comparison: | | | | | | |
| 1 | 75 | 15 | 10 | | >180 | 0 |
| 2 | 75 | 20 | 5 | | 30 | 0 |
| This invention: | | | | | | |
| 3 | 80 | 10 | | 10 | <5 | >90 |
| 4 | 75 | 20 | | 5 | | |
| 5 | 75 | 15 | | 10 | <5 | >90 |
| 6 | 75 | 10 | | 15 | <5 | >90 |
| 7 | 70 | 20 | | 10 | <5 | >90 |
| 8 | 70 | 15 | | 15 | <5 | >90 |
| 9 | 65 | 20 | | 15 | <5 | >90 |

Example I

In each of a series of experiments, a monomeric mixture composed of varying amounts of vinylidene chloride, vinyl chloride, and vinyl propionate was dispersed by vigorous agitation in a mixture consisting of 1.6 parts of the dihexyl ester of sodium sulfosuccinic acid, 0.4 part of potassium persulfate, 0.04 part of potassium sulfate, and amounts of water sufficient to form an aqueous dispersion having a total solids content of about 55 parts by weight. Each of the resulting aqueous dispersions was heated to 45° C. in a closed reactor capable of withstanding the pressure developed during polymerization of the monomeric mixtures, until a 75 percent pressure drop occurred, after which the reactor was vented, heated to a temperature of 60° C., and subsequently cooled to about 25° C. and evacuated for a period of about one-half hour to remove the residual monomer. Each aqueous dispersion was subsequently post-formulated with 3 parts by weight based on the total weight of the aqueous dispersion of Triton It can be seen from Table I that the interpolymerizates contained in the aqueous dispersions of the present invention have a noticeably reduced crystallization induction period as compared to the comparative Run Nos. 1 and 2 illustrated therein. Comparative Run Nos. 1 and 2 above are further characterized by an essentially complete lack of crystallinity following 15 minutes of heating at 70° C.

The following Table II illustrates: The resistance of the interpolymerizates employed in the present invention to crystallization during storage in aqueous dispersion and the effect of aging upon percent elongation of a film produced herein; the temperature required to heat-seal a coating applied to paper from the aqueous dispersions of the present invention, and the effect of aging upon the heat-seal temperatures of such coated paper; and the effect of the particle size of the interpolymerizate upon crystallization of the aqueous dispersions described herein.

TABLE II

| Run No. | Composition of interpolymerizate, percent by weight of polymerizable materials | | | Particle size of interpolymerizate, angstrom units | Time required for initial crystallization in aqueous dispersion, weeks at designated temp. | | Percent elongation of film during aging at 76° F. | | Temperature to heat-seal cooled paper during aging at 76° F. | |
|---|---|---|---|---|---|---|---|---|---|---|
| | Vinylidene chloride | Vinyl chloride | Vinyl propionate | | 25° C. | 80° C. | 1 day | 18 weeks | 1 week (° C.) | 18 weeks (° C.) |
| 10 | 80 | 10 | 10 | 1,825 | 11 | 2 | 344 | 39 | 110 | 110 |
| 11 | 80 | 5 | 15 | 1,710 | 20 | 4 | | | | |
| 12 | 80 | 10 | 10 | 1,145 | >28 | 24 | | | | |
| 13 | 80 | 5 | 15 | 995 | 28 | 28 | 440 | 76 | 110 | 110 |
| 14 | 75 | 10 | 15 | 960 | >28 | >28 | 498 | 350 | 90 | 90 |
| 15 | 75 | 5 | 20 | 1,020 | 24 | 24 | 314 | 386 | 100 | 100 |

X-100, an alkyl aryl polyether alcohol manufactured by the Rohm and Haas Company.

Individual films were cast from such dispersions at normal room temperatures on glass plates using a 10 mil casting bar.

Each of the so-formed films was allowed to coalesce for a period of 4 hours after which individual film strips about 4 inches long and ½ inch wide were obtained. The crystallization induction period and amount of crystallinity were The resistance of the interpolymerizates to crystallization in aqueous dispersion was determined by aging such dispersions for varying time periods at 76° F., followed by coalescence of such dispersions onto individual strips of transparent polystyrene, in the form of essentially continuous coatings having a thickness of about one mil. Initial effect of crystallization within such dispersion was evidenced by a whitening of the coating formed on the transparent polystyrene film.

The effect of aging upon the percent elongation of films produced from the aqueous dispersions of the present invention was determined by casting films from such dispersions onto glass plates by the method as described herein. The so-formed films were then cut into strips about 0.45 inch wide and 6 inches long and aged for varying time periods at a temperature of 76° F. After aging, the percent elongation of each film was individually determined using procedures well known in the art.

The temperatures required to heat-seal films obtained from the aqueous dispersions of the present invention were determined by individually coating samples of a 51-pound sulfate paper with such dispersions using a No. 6 wire-wound rod. Each of the coated paper samples was substantially dried in a convection oven operating at 80° C. Each dried coated paper sample was then aged at 76° F. for periods ranging from 1 to 18 weeks and subsequently heat-sealed to determine initially required heat-seal temperatures as well as to detect changes in heat-seal temperatures during aging of the coated paper.

Interpolymerizate particle size was determined by conventional procedures using electron micrographs.

The following Table III illustrates physical property data of a film produced from an aqueous dispersion containing the expressed amounts of an interpolymerizate composed of vinylidene chloride, vinyl chloride, and vinyl propionate. Comparative data are provided using films produced from aqueous dispersions of interpolymerizates composed of vinylidene chloride, vinyl chloride, and ethyl acrylate. The tensile strength and percent elongation of each film was obtained using the procedures essentially as described by A.S.T.M. Test No. D–638–58T, and the moisture-vapor transmission rate was obtained using the procedures as essentially described in the TAPPI Test No. T464–M–45.

present invention which are in the form of particles, the majority of which are less than about 1200 angstrom units, are more desirable.

Results shown on Table III additionally indicate that the aqueous dispersions of interpolymerizates composed of vinylidene chloride, vinyl chloride, and ethyl acrylate as illustrated by comparative Run Nos. 16 and 17 have a significantly longer crystallization induction period when coalesced to form films and are additionally characterized by having noticeably reduced moisture-barrier properties, as compared to films produced from the aqueous dispersions of the present invention.

It has further been found that interpolymerizates of vinylidene chloride with various monethylenically unsaturated monomers which have reactivities similar to that of vinylidene chloride, and which interpolymerizates have the desirable crystallization induction properties described herein, are characterized by noticeably reduced flexural properties and somewhat higher heat-sealed temperatures, as compared to the interpolymerizates useful for the purpose of the present invention.

Similar good results, as illustrated and described herein, are obtained using aqueous dispersions of the interpolymerizates composed of (1) between about 65 and 80 weight percent vinylidene chloride, (2) between about 5 and 20 weight percent of vinyl chloride, and (3) between about 5 and 15 weight percent of a vinyl alkanoate, as described herein, preferably wherein the interpolymerizate of the dispersion is in the form of particles, the majority of which are less than about 1200 angstrom units in diameter.

What is claimed is:

1. In the process of coating substrates with rapidly crystallizable vinylidene chloride polymers the improvement consisting of coating said substrate with an aqueous

TABLE III

| Run No. | Composition of interpolymerizate, percent by weight of polymerizable materials | | | | Crystallization induction period, minutes at 70° C. | Elongation following 15 weeks aging at 76° F., percent | Tensile strength following 15 weeks aging at 76° F., p.s.i. | Moisture vapor transmission, 0.3 mil film under 100 pressure for 24 hours |
|---|---|---|---|---|---|---|---|---|
| | Vinylidene chloride | Vinyl chloride | Ethyl acrylate | Vinyl propionate | | | | |
| For comparison: | | | | | | | | |
| 16 | 75 | 20 | 5 | | 30 | 55 | 3,220 | |
| 17 | 75 | 15 | 10 | | >180 | | | 1.5 |
| This invention: 18 | 75 | 15 | | 10 | <5 | 182 | 3,990 | 0.31 |

It can be seen from Table II and Table III that the interpolymerizates contained in the aqueous dispersions of the present invention remain essentially non-crystalline for a period of many weeks during storage of the aqueous dispersion under normal conditions of temperature and pressure, and upon coalescence into films following such storage, provide the desirable properties of rapid crystallization to form essentially non-blocking, fused coatings having excellent moisture-barrier and strength properties.

Conversely, aqueous dispersions containing essentially polyvinylidene chloride have been observed to crystallize noticeably following several days of storage under normal conditions, and are often difficultly coalesced to form continuous coatings having the desirable properties described herein. Further, aqueous dispersions containing interpolymers of the compositions as described herein but wherein the vinylidene halide constituent is present in amounts of less than about 65 weight percent, based on the weight of interpolymer, are insufficiently crystallizable to provide required moisture-barrier and strength properties.

Still further, substitution of vinyl acetate for the vinyl propionate in the compositions as described by Run Nos. 10–15 of Table II have been observed to crystallize noticeably within several days of storage and are difficultly coalesced to form essentially continuous coatings having the desirable properties as described herein.

Additionally, the results shown on Table II indicate that the aqueous dispersion of interpolymerizates of the dispersion of an interpolymerizate composed essentially of (1) between about 65 and 80 weight percent of vinylidene chloride, (2) between about 5 and 20 weight percent of vinyl chloride, and (3) between about 5 and 20 weight percent of a vinyl alkanoate having from 3 to 8 carbon atoms in the acid portion.

2. The process of claim 1 wherein the interpolymerizate of said dispersion is in the form of particles, the majority of which are less than about 1200 angstrom units in diameter.

3. The process of claim 2 wherein said vinyl alkanoate is vinyl propionate.

4. The process of claim 3 wherein said substrate is a cellulose substrate.

References Cited

UNITED STATES PATENTS

| 2,328,748 | 9/1943 | Scott et al. | 260—80.77 |
| 2,541,167 | 2/1951 | Pitzi | 260—80.81 |
| 3,092,598 | 6/1963 | Hahn et al. | 260—80.77 |

SAMUEL H. BLECH, Primary Examiner

W. J. BRIGGS, Sr., Assistant Examiner

U.S. Cl. X.R.

117—122, 161; 260—29.6, 80.77